Oct. 15, 1963    J. R. WARD, JR    3,106,858
MACHINE FOR MAKING PATTERNED GLASS
Filed April 15, 1960    2 Sheets-Sheet 1

INVENTOR:
John Robertson Ward Jr.
BY Bair, Freeman & Molinare
ATTORNEYS.

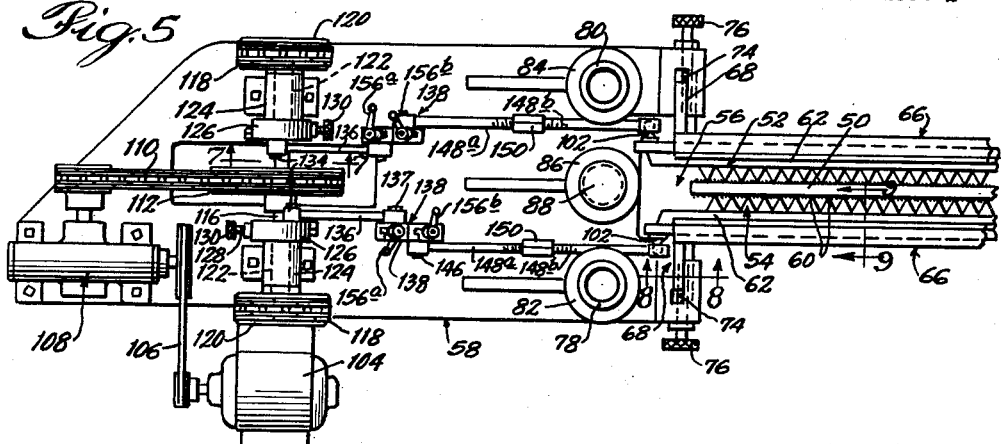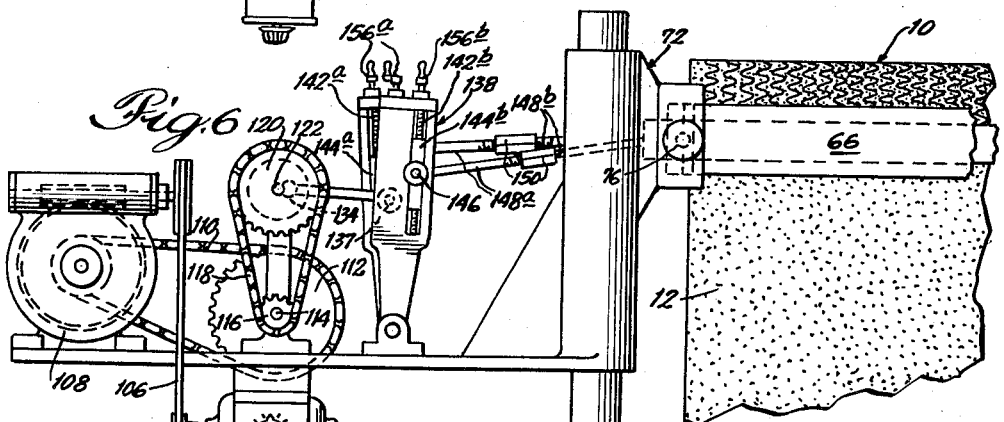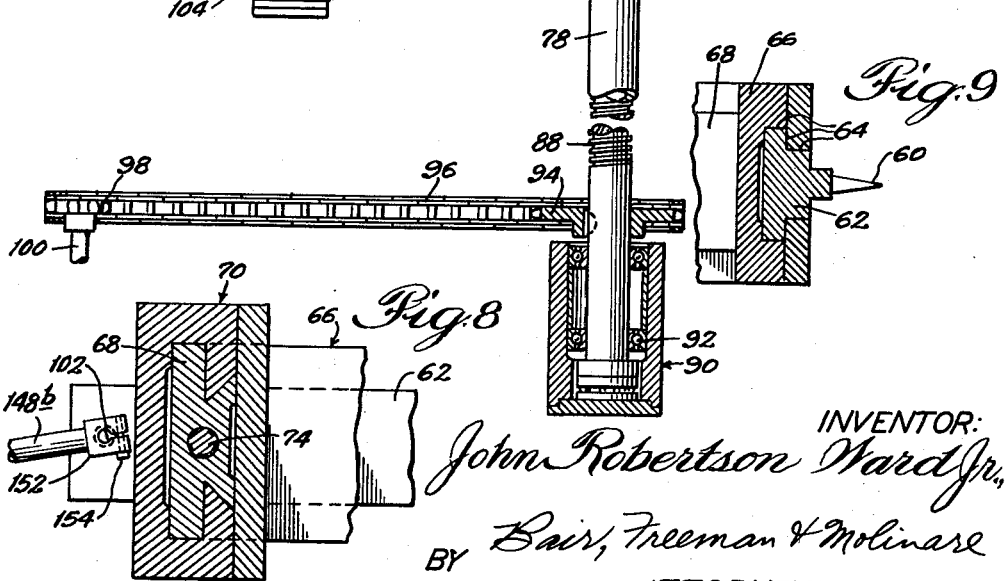

United States Patent Office 3,106,858
Patented Oct. 15, 1963

3,106,858
MACHINE FOR MAKING PATTERNED GLASS
John Robertson Ward, Jr., 17 E. Elm St., Chicago, Ill.
Filed Apr. 15, 1960, Ser. No. 22,467
8 Claims. (Cl. 83—5)

This invention relates to a method and machine for making patterned glass and more particularly relates to a method and machine for producing, from ordinary, substantially flat, sheet glass, including plate glass, a surface patterned glass which is susceptible of use as a window glass for solar heat control, glare control, light transmission control or visual transmission control.

It is well known that glass products designed for use as window glass may be modified in a number of ways to effect solar heat control, glare control, light transmission control or visual transmission control. However, heretofore such products have been relatively expensive to produce, thereby limiting the availability and desirability of light and heat controlling glass products of the type mentioned. It will be appreciated that if a reliable, inexpensive method of production existed for producing light and heat controlling glass products, then there would be a substantial market created for such products.

Constructions have heretofore been proposed, in the production of light and heat controlling glass products, which contemplate the lamination of sheets of glass and other laminae, and which contemplate some deformation of the flat surface of a glass sheet. Clearly the production of products by means of lamination is costly, and, equally clearly, surface deformation is undesirable as it adversely affects the visual transmission qualities of the glass products.

Now, one of the very important features of this invention is the fact that simple, ordinary, sheets of glass, including commercial plate glass and sheet glass, is utilized in producing a surface patterned glass which is susceptible of use as a window glass for the complex functions of effecting solar heat control, glare control, light transmission control, or visual transmission control.

It is, accordingly, the principal object of this invention to provide a method and machine for treating ordinary sheets of glass to produce a surface patterned glass.

One of the problems involved in the use of patterned glass products to effect heat and light control lies in the difficulty of mass producing an accurately patterned glass product at a reasonable cost.

Therefore it is another object of this invention to provide a method and machine for producing a surface patterned glass which is characterized by the accuracy of pattern control and production and by simplicity and inexpensiveness of both method of production and means of production.

Still a further object of this invention is to provide a method and machine for producing surface patterned glass which are particularly susceptible of being integrated in mass production systems and techniques.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 illustrates certain steps in the process herein disclosed of producing a surface patterned sheet of glass.

FIGURE 2 illustrates how the surface patterns on opposite sides of a patterned sheet of glass may be offset from each other to obtain the composite shown and so as to obtain one type of effect in solar heat or light transmission, while FIGURE 3 illustrates another composite pattern that may be obtained by surface treating opposite sides of the glass sheet, and FIGURE 4 illustrates still another composite pattern obtainable with the machine disclosed herein.

FIGURE 5 is a top-plan of a machine which is capable of producing the type of patterned glass shown in FIGURES 2–4.

FIGURE 6 is a fragmentary side elevation view of the machine of FIGURE 5.

FIGURE 8 is an enlarged cross-section view taken on line 8—8 of FIGURE 5.

FIGURE 9 is an enlarged cross-section view taken on line 9—9 of FIGURE 5.

Figure 1:
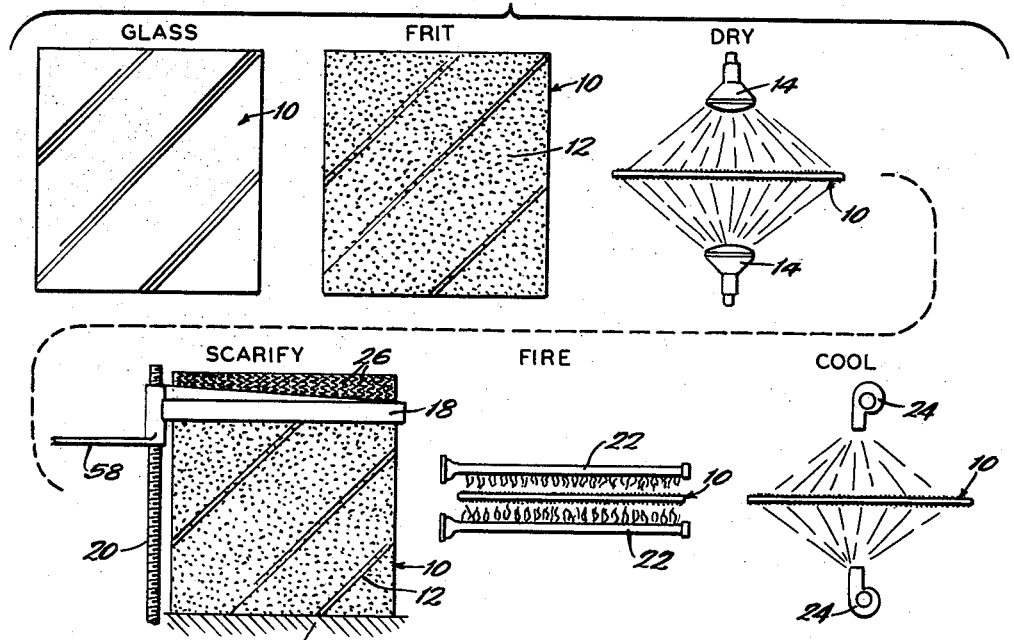

Referring now to the drawings, FIGURE 1 illustrates, by six illustrations, certain steps in the method of making patterned glass in accordance with the invention disclosed herein. The steps are titled, in their order of occurrence, Glass, Frit, Dry, Scarify, Fire, and Cool.

In its broadest concept, the method of making patterned glass comprises the steps of first, providing a sheet of glass 10, as indicated in the upper left-hand illustration in FIGURE 1; second, then depositing, by spreading over, dipping, spraying or the like on at least one side of the glass sheet 10 at least one layer 12 of a dispersion of frit in a liquid carrier, said layer of frit being disposed over an uninterrupted area on the side of the sheet of glass 10; third, the sheet of glass 10, with layer, or layers, of frit in liquid carrier thereon, is then subjected to a drying operation, as generally illustrated in the upper right-hand illustration of FIGURE 1, and the frit layer, or layers, are dried until the layers of frit on the sheet of glass are in dried, powdery form, and this drying is effected by the application of heat, such as produced by heat lamps 14 or the like, at a temperature above the vaporization temperature of the liquid carrier of the frit but also at a temperature below the annealing temperature of the frit.

In the next, or fourth, step of the process, as indicated in the lower left-hand illustration of FIGURE 1, the sheet of glass 10 is positioned in a substantially vertical plane, supported on edge by a base 16, and scarifiers 18 are applied to the layer, or layers, of dried, powdery frit which is on the surface of the glass sheet, and the scarifiers are moved along a transverse 20 and operate, along a plurality of lines, to scrape or scratch the powdery frit off of the sheet of glass, and in a predetermined manner so as to expose a predetermined pattern of the original sheet of glass; in the fifth step, after the pattern has been scratched through the frit layer, the sheet of glass with frit thereon is fired by gas burners 22 at a temperature above the annealing point of the frit, thereby effecting an annealing-type bond between the frit and the glass sheet; and in the final step, in a production line set up, the sheet of glass with annealed frit thereon is cooled by having cooling gases blown thereover by blowers 24.

When the annealing occurs, and if the frit is of a non-transparent quality, then the glass that is produced will have portions which are non-transparent corresponding with the portions with the frit thereon, and said sheet will also have portions which are transparent, the transparent portions corresponding with the areas from which the frit had been removed by the scarifiers.

There are certain variations in the basic method disclosed hereinabove, which variations may be preferred and will now be described. For example, it is preferable to apply frit layers on opposite sides of the sheet of glass, and it is also preferable that the glass be moved from step to step in the process and through each step in the process while being carried in a vertical plane.

It is most important that the sheet of glass be passed through the scarifying means while being maintained in a vertical plane, and after the sheet of glass has had layers of frit applied to both sides thereof, and the layers of frit have been dried, the sheet of glass with the dried, powdery frit on both sides thereof is moved to a station whereat the glass is either suspended from a conveyor chain or is positioned to rest its lower edge on a support 16. In the preferred embodiment, scarifying means are then applied simultaneously to opposite sides of the sheet of glass, and relative motion is effected between the sheet of glass and the scarifying means, so as to simultaneously scarify opposite sides of the sheet of glass to remove the dried, powdery frit therefrom in predetermined patterns. The scarification of opposite sides of the glass sheet is coordinated, in a manner hereinafter described, to effect a desired relationship between the pattern of exposed glass on one side of the sheet of glass with the pattern of exposed glass on the other side of the sheet of glass, so as to obtain desired results of interference and registration by said patterns. Because of the fact that the scarifying means engage opposite sides of the sheet of glass simultaneously, the necessity of lateral supports for the glass is obviated, so that the only requirement is that the glass be supported either by a suspension means or by engagement with the lower edge thereof, with the sheet of glass maintained in a substantially vertical plane.

When the sheet of glass is suspended from a suspension chain or the like, then the glass may either be moved relative to the scarifying means, or the scarifying means may be moved relative to the glass. In the preferred form of operation illustrated in the lower left-hand illustration of FIGURE 1, the glass is engaged at its lower edge by a support 16, and the scarifying means 18 are moved downwardly relative to the glass plate to produce scarifications 26. After scarification has been effected, the frit is fired at a temperature above its annealing point, so that the frit is annealed simultaneously on both sides of the sheet of glass.

Now, the purpose of providing predetermined patterns on the surfaces of the sheet of glass is either for the purpose of providing an ornamental appearance to the glass, or to provide means of solar heat control, glare control, or light transmission control, to the glass sheet. Where a plurality of fine lines are scarified through the frit layers on opposite sides of the sheet of glass, the registration of these lines permits of light transmission through such registered patterns. By displacement of the energy, or light, transmitting lines on one side of the glass sheet relative to the lines on the other side, certain controls may be embodied in the sheet of glass which effect, for example, light exclusion and, correspondingly, solar heat exclusion, or which provide for visual transmission only at selected angles. Such a sheet of glass provided with such patterns thereon can be constructed to permit a person on one side of the sheet of glass to see through the glass at a selected angle, while denying to a person on the other side of the sheet of glass the ability to see through at other angles. In any event, the patterning of glass sheets, either for decorative effect, or for solar heat and light control effects, has great commercial possibilities, and with regard to solar heat transmitting and light transmitting operations, the patterning of the glass on both sides provides a wide range of variants which may be selected and utilized by the manufacturer to achieve various effects.

Figure 2:
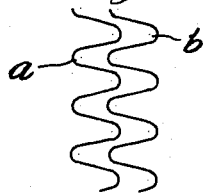
Figure 3:
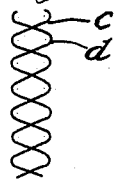
Figure 4:
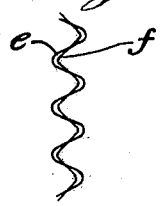
Figure 7:
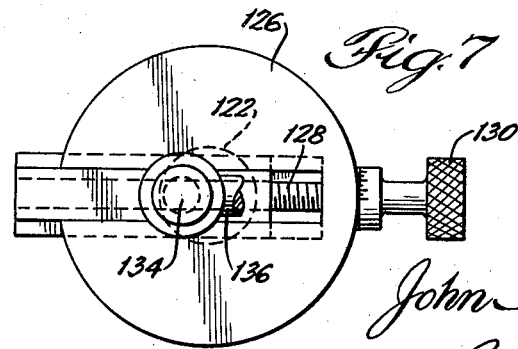
FIGURE 7 is an enlarged view taken substantially on line 7—7 of FIGURE 5.

It will be appreciated that the scarifying means can be caused to draw parallel lines on both sides of the sheet of glass, and these parallel lines may be offset relative to each other or registered relative to each other. This is rather a simple variant. However, certain other more complex variants are possible, and some of these are shown in FIGURES 2–4 of the drawings. It is contemplated that, in a preferred form, the scarifiers will produce a scarification line which is generally wave form, or sine-wave-form-like in appearance, as illustrated in each of the FIGURES 2, 3 and 4.

In each of said FIGURES 2, 3 and 4, two waves are shown and one wave "a" represents a scarification on one side of the sheet of glass and the other wave "b" represents a scarification on the opposite side of the sheets of glass. In FIGURE 2, shown in greatly enlarged and illustrative form for the purpose of illustration, the axes of the two wave forms are laterally displaced from each other, so that registration between the corresponding waves on opposite sides of the sheet of glass is effected only at a particular angle with respect to the sheet of glass. In FIGURE 3, one of the waves "c" has a lead, or lag, with respect to the other wave "d," thereby producing a generally interfering pattern as shown. In FIGURE 4, the two waves "e" and "f" have different amplitudes, thereby producing an additional type of interfering pattern as shown.

It is the purpose of the machine, which is described and shown herein in FIGURES 5–9, to produce wave patterns of the general type shown in FIGURES 2, 3 and 4, and also to produce more complicated wave patterns which are a combination of any two or three of the variants shown in FIGURES 2, 3 and 4. Thus, for example, the machine herein disclosed is designed to produce patterns which not only may have an axial displacement, as shown in FIGURE 2, but may also have the lead, or lag, of FIGURE 3 and, in addition, may also include the amplitude variation of FIGURE 4. Obviously, with this number of variants available, patterns of unusual complexity may be produced.

Referring now to FIGURES 5–9, the said figures show a machine which will produce the patterns herein referred to. FIGURE 5 shows a sheet of glass 50 which is positioned between a pair of spaced scarifying means, or assemblies, 52 and 54, the said scarifying means being spaced apart to define a laterally opening, and open ended, recess 56 into which the glass sheet 50 is introduced. The scarifying means 52 and 54 are carried on a carriage generally indicated at 58, as can best be seen by reference to FIGURE 6. Each of the scarifying means 52 and 54 comprises a plurality of scarifying teeth 60, which are carried on an elongated bar 62 which is shaped and arranged relative to track means 64, so that the bar 62 is reciprocally movable only in opposite directions along track means 64. Each track means 64 is defined by frame means generally indicated at 66, including a frame mounting portion 68 which extends perpendicular to bar 62.

Each frame mounting portion 68 is shaped, as best seen in FIGURE 8, to provide a sliding tongue and groove cooperation between frame mounting 68 and a track means 70 which is rigidly connected to a support means 72 carried by carriage 58. The frame mountings 68 are appropriately adjustably maintained in selected positions by means of a threaded screw adjuster 74 provided with a manual control 76. The screw adjuster 74 includes a threaded stem which is connected at its extended end to the frame mounting 68, so as to effect movement thereof, and a portion of the stem of adjuster 74 is threaded in a portion of support 72, whereby rotary manipulation of the manual control 76 will cause sliding movement of frame mounting 68 in track means 70, so as to cause the scarifying assemblies 52 and 54 to move toward and away from each other, as desired, and preferably to have both assemblies simultaneously engage opposite sides of the glass sheet 50.

The vertical movement of the carriage 58, and the scarifiers 52 and 54 carried thereby, is constrained along a predetermined path, in directions transverse to the directions of reciprocating movement of bars 62, by means of a pair of upright posts 78 and 80 slidably cooperating with telescoping sleeves 82 and 84 which are rigidly carried by carriage 58. There is also provided a central sleeve 86 on carriage 58, having an internally threaded portion for cooperation with an elongated threaded shaft 88, the cooperation between shaft 88 and sleeve 86 effecting the selective drive of carriage 58 in vertical directions longitudinally of the sheet of glass 50. Shaft 88 is appropriately journaled for rotation, and, as seen in FIGURE 6, the lower end of shaft 88 is journaled in support 90 by bearing means 92. The shaft 88 also has keyed thereto a sprocket 94 over which is trained a drive chain 96 which transmits power from a drive sprocket 98 carried on a shaft 100 which is appropriately driven by a drive means (not shown), such as a motor or the like.

The bars 62 of the scarifying assemblies 62 and 64 are provided with drive studs 102 on the innermost ends thereof positioned inwardly, or to the left, as seen in FIGURE 5, of frame mountings 68. Means are provided on the carriage 58 for effecting reciprocating movement of the bars 62 carrying scarifiers 60 thereon, in a manner as now described.

The carriage 58 carries thereon a drive motor 104, power from which is transmitted by means of belt 106 to a gear reducer 108, and from thence, by means of chain 110 to a large sprocket 112 carried on shaft 114, which shaft also carries a spaced pair of small sprockets 116. Each of the small sprockets 116 transmits power by means of a chain 118 to a large sprocket 120, thereby serving as a further speed reducer. The large sprockets 120 are mounted for rotation on axially aligned, but spaced, stub shafts 122 which are journaled in blocks 124 carried on carriage 58. Each stub shaft 122 carries thereon a drive member 126, additional details of which are more clearly seen in FIGURE 7.

The drive member 126 carries set screw means 128 with a manual control 130, adapted for cooperation with shaft 122, and the arrangement permits of relative rotation between drive member 126 and its shaft 122, to a desired point of adjustment. The drive member 126 carries thereon a stud 134 eccentric with respect to shaft 122, and there is provided an elongated link 136, pivotally connected to eccentric stud 134 at one end thereof and connected at its other end to a pivotally mounted driver, generally indicated at 138. The driver is pivotally mounted on pin 140 carried by carriage 58, and the driver also carries thereon a pair of elongated threaded shafts 142a and 142b which extend generally radially of the axis of pin 140. There are provided collars 144a and 144b which are respectively telescopically threaded on the elongated screws 142a and 142b and which carry thereon pins to which links may be connected. The collar 144a carries a pin 137 to which the link 136 connects. The collar 144b carries a pin 146 to which elongated shaft means are pivotally connected, said shaft means including members 148a and 148b having threaded portions interconnected by an elongated sleeve 150. The extended end of shaft 148b carries thereon a split block 152 having a clamping screw 154, which permits of releasable gripping connection of block 152 with stud 102 of a scarifier assembly 52 or 54.

The elongated screws 142a and 142b are provided with manual controls 156a and 156b, respectively, which permit manual adjustment of the position of the collars 144a and 144b along said screws, and so as to permit of adjustment of the location of the scarifiers 60 on one scarifier assembly relative to the other scarifier assembly.

From the foregoing, it will be seen how there have ben provided sufficient controls to obtain the variations of axial displacement, lead and lag, or amplitude, between the corresponding scarifications on opposite sides of the plate of glass, as is illustrated in FIGURES 2–4. It will be understood that by the adjustment of controls 76, the spacing relationship between the scarifying teeth 60 or means 52 and 54 may be adjusted, to accommodate glass plates of various thicknesses. The independent adjustment of members 126, relative to their stub shafts 122, provides for lead or lag variations between the scarifications produced by scarifiers 52 and 54. The variations in axial displacement, or offset, of corresponding scarifications located on opposite sides of the glass sheet may be obtained by adjustment of the spacing means, including collars 150, which operate to change the effective length of the links formed by link members 148a and 148b. An amplitude adjustment is obtained for any wave pattern independently of the wave pattern on the opposite sides of the glass sheet by varying the position of collars 144a and 144b along the screws 142a and 142b.

The scarifying assemblies 52 and 54 may be coordinated through the adjustments herein described to produce a cordinated scarification of opposite sides of a frit-layered sheet of glass so as to produce desired patterns having desired interference and registration characteristics.

It will be understood that by varying the velocity relationship of the drives 100 and 104, a variation in pitch adjustment may also be achieved. Thus, relatively speeding up shaft 100 will elongate the pitch of the wave forms shown in FIGURES 2–4, while slowing down relative movement of carriage 58 along screw 88 will reduce the pitch of the wave forms.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A machine for applying patterns to a sheet of glass coated on at least one side thereof with a layer of frit, said machine comprising, in combination: means for receiving a frit-coated, elongated sheet of glass at a preselected attitude; a first drive means including a carriage for movement in directions longitudinally of said sheet of glass; scarifying means on said carriage adapted to engage the frit-coated side of a sheet of glass, said scarifying means being mounted for reciprocating movement transverse to the directions of movement of said carriage, and a second drive means for reciprocating said scarifying means relative to said carriage as said carriage is moved by said first drive means.

2. A machine for applying patterns to a sheet of glass coated on opposite sides thereof with layers of frit, said machine comprising, in combination: a pair of scarifying assemblies spaced apart to define a glass-receiving recess therebetween, spacing-adjustment means for adjusting the spacing between said spaced scarifying assemblies to conform to the thickness of a glass sheet, so as to have both scarifying assemblies simultaneously engage opposite sides sides of a glass sheet, a first means including said scarifying assemblies for scribing, in the layers of frit, predetermined patterns extending longitudinally of said sheet of glass on both sides of said sheet of glass, and spacing means for selectively varying the offset in register of corresponding scarifications located on opposite sides of said sheet of glass.

3. A machine for applying patterns to a sheet of glass coated on opposite sides thereof with layers of frit, said machine comprising, in combination: a pair of scarifying assemblies spaced apart to define a gloss-receiving recess therebetween, spacing-adjustment means for adjusting the spacing between said spaced scarifying assemblies to conform to the thickness of a glass sheet, so as to have both scarifying assemblies simultaneously engage opposite sides of a glass sheet, a first means including said scarifying assemblies for scribing, in the frit, predetermined wave patterns extending longitudinally of said sheet of glass on both sides of said sheet of glass, and amplitude-adjustment means for independently varying the amplitude of the wave patterns on each side of the sheet of glass.

4. A machine for applying patterns to a sheet of glass coated on opposite sides thereof with layers of frit, said machine comprising, in combination: a pair of scarifying assemblies spaced apart to define a glass-receiving recess therebetween, spacing-adjustment means for adjusting the spacing between said spaced scarifying assemblies to conform to the thickness of a glass sheet, so as to have both scarifying assemblies simultaneously engage opposite sides of a glass sheet, a first means including said scarifying assemblies for scribing, in the frit, predetermined wave patterns extending longitudinally of said sheet of glass on both sides of said sheet of glass, and pitch-adjustment means for varying the pitch of the wave patterns.

5. A machine for applying patterns to a sheet of glass coated on opposite sides thereof with layers of frit, said machine comprising, in combination: a pair of scarifying assemblies spaced apart to define a glass-receiving recess therebetween, spacing-adjustment means for adjusting the spacing between said spaced scarifying assemblies to conform to the thickness of a glass sheet, so as to have both scarifying assemblies simultaneously engage opposite sides of a glass sheet, a first means including said scarifying assemblies for scribing, in the frit, predetermined wave patterns extending longitudinally of said sheet of glass on both sides of said sheet of glass, and lead-adjustment means for independently varying the lead of the wave pattern on one side of the sheet of glass relative to the wave pattern on the other side of the sheet of glass.

6. A machine for applying patterns to a sheet of glass coated on opposite sides thereof with layers of frit, said machine comprising, in combination: a pair of scarifying assemblies spaced apart to define a glass-receiving recess therebetween, spacing-adjustment means for adjusting the spacing between said spaced scarifying assemblies to conform to the thickness of a glass sheet, so as to have both scarifying assemblies simultaneously engage opposite sides of a glass sheet, a first means including said scarifying assemblies for scribing, in the frit, predetermined wave patterns extending longitudinally of said sheet of glass on both sides of said sheet of glass, and offset-adjusting means for varying the transverse offset between a wave on one side of the sheet of glass with the corresponding wave on the other side of the sheet of glass.

7. A machine for applying patterns to a sheet of glass coated on opposite sides thereof with layers of frit, said machine comprising, in combination: a pair of scarifying assemblies spaced apart to define a glass-receiving recess therebetween, spacing-adjustment means for adjusting the spacing between said spaced scarifying assemblies to conform to the thickness of a glass sheet so as to have both scarifying assemblies simultaneously engage opposite sides of a glass sheet, a first means including said scarifying assemblies for scribing, in the frit, predetermined wave patterns extending longitudinally of said sheet of glass on both sides of said sheet of glass, amplitude-adjustment means for independently varying the amplitude of the wave patterns on each side of the sheet of glass, and offset-adjusting means for varying the transverse offset between a wave on one side of the sheet of glass with the corresponding wave on the other side of the sheet of glass.

8. A machine for applying patterns to a sheet of glass coated on opposite sides thereof with layers of frit, said machine comprising, in combination: a pair of scarifying assemblies spaced apart to define a glass-receiving recess therebetween, spacing-adjustment means for adjusting the spacing between said spaced scarifying assemblies to conform to the thickness of a glass sheet so as to have both scarifying assemblies simultaneously engage opposite sides of a glass sheet, a first means including said scarifying assemblies for scribing, in the frit, predetermined wave patterns extending longitudinally of said sheet of glass on both sides of said sheet of glass, lead-adjustment means for independently varying the lead of the wave pattern on one side of the sheet of glass relative to the wave pattern on the other side of the sheet of glass, and offset-adjusting means for varying the transverse offset between a wave on one side of the sheet of glass with the corresponding wave on the other side of the sheet of glass.

References Cited in the file of this patent

UNITED STATES PATENTS

| | | |
|---|---|---|
| 266,507 | Oudinot | Oct. 24, 1882 |
| 1,657,784 | Bergstrom | Jan. 31, 1928 |
| 1,830,887 | Renz | Nov. 10, 1931 |
| 1,867,068 | Fowler | July 12, 1932 |
| 1,994,483 | Ott | Mar. 19, 1935 |
| 2,178,273 | Wittenburg | Oct. 31, 1939 |
| 2,567,723 | McCoy et al. | Sept. 11, 1951 |